(12) United States Patent
Hecht

(10) Patent No.: US 7,326,007 B2
(45) Date of Patent: Feb. 5, 2008

(54) CUTTING TOOL AND CUTTING INSERT THEREFOR

(75) Inventor: Gil Hecht, Nahariya (IL)

(73) Assignee: Iscar Ltd., Tefen (IL)

( * ) Notice: Subject to any disclaimer, the term of this patent is extended or adjusted under 35 U.S.C. 154(b) by 0 days.

(21) Appl. No.: 11/613,262

(22) Filed: Dec. 20, 2006

(65) Prior Publication Data
US 2007/0086864 A1 Apr. 19, 2007

Related U.S. Application Data

(63) Continuation of application No. 11/060,740, filed on Feb. 18, 2005, now Pat. No. 7,163,361.

(30) Foreign Application Priority Data
Apr. 14, 2004 (IL) ........................... 161373

(51) Int. Cl.
*B23B 29/04* (2006.01)
(52) U.S. Cl. .................. 407/109; 407/117; 407/50
(58) Field of Classification Search ............... 407/109, 407/110, 107, 100, 113, 114, 40, 50, 117; *B23B 29/04*
See application file for complete search history.

(56) References Cited

U.S. PATENT DOCUMENTS

| | | | |
|---|---|---|---|
| 3,551,975 A | 1/1971 | Novkov | |
| 3,785,021 A | 1/1974 | Norgren | |
| 4,417,833 A | 11/1983 | Wertheimer | |
| 4,580,930 A | 4/1986 | Zinner | |
| 4,588,333 A | 5/1986 | Gustafson | |
| 4,588,974 A | 5/1986 | Hill | |
| 4,645,385 A | 2/1987 | Keller | |
| 4,744,278 A | 5/1988 | Wright | |
| 4,801,224 A | 1/1989 | Pettersson et al. | |
| 5,150,992 A | 9/1992 | Friedmann | |
| 5,360,298 A | 11/1994 | Hedlund | |
| 5,411,354 A | 5/1995 | Gustafsson | |
| 5,439,327 A | 8/1995 | Wertheim | |
| 5,775,854 A | 7/1998 | Wertheim | |
| 5,829,924 A | 11/1998 | Oshnock et al. | |
| 6,116,823 A | 9/2000 | Mihic | |
| 6,565,292 B2 | 5/2003 | Hecht | |
| 6,702,527 B2 | 3/2004 | Barazani | |
| 6,702,529 B1 | 3/2004 | Tagtstrom et al. | |
| 2002/0081165 A1 | 6/2002 | Hecht | |

FOREIGN PATENT DOCUMENTS

DE 4037984 6/1991
EP 0012211 6/1980

*Primary Examiner*—Monica Carter
*Assistant Examiner*—Sara Addisu
(74) *Attorney, Agent, or Firm*—Womble Carlyle

(57) ABSTRACT

A cutting tool in which a cutting insert is resiliently retained. The cutting insert includes a locating portion and a cutting portion having a rake surface and a relief surface. The locating portion extends from the cutting portion away from the rake surface.

30 Claims, 3 Drawing Sheets

CUTTING TOOL AND CUTTING INSERT THEREFOR

RELATED APPLICATIONS

This is a Continuation of U.S. patent application Ser. No. 11/060,740, filed Feb. 18, 2005, now U.S. Patent No. 7,163,361. The contents of the aforementioned parent application are incorporated by reference in their entirety.

FIELD OF THE INVENTION

The present invention relates to cutting tools of the type in which a cutting insert is resiliently clamped in a self-retaining manner in an insert pocket.

BACKGROUND OF THE INVENTION

Cutting tools employing a resilient clamping mechanism for clamping cutting inserts are generally of relatively narrow thickness, typically in the range of 0.5 mm to 12 mm and the cutting insert is retained in an insert pocket located between the clamping surfaces of upper and lower jaws of the cutting tool. In cutting operations such as grooving and parting off the cutting tool is in the form of a holder blade. The holder blade is, in turn, generally clamped in a blade-retaining block. The holder blade is generally provided with a suitably designed opening, in the vicinity of the insert pocket whereby a relatively narrow bridging portion is formed enabling a limited degree of resilient displacement of one of the holder blade's jaws relative to the other. Generally, the lower jaw is rigid and the upper jaw is resiliently displaceable. The opening can be of the form of an aperture, or a slot, or a slot terminating in an aperture. Examples of such cutting tools are disclosed in U.S. Pat. Nos. 3,785,021, 4,580,930 and 5,829,924. A rotary slot-cutting tool employing a resilient insert clamping mechanism is disclosed in U.S. Pat. No. 4,417,833. The cutter body is disc-shaped and of relatively narrow thickness, with cutting insert pockets located around its periphery. As with the holder blade, an insert pocket of a rotary slot-cutting tool has two jaws between which an insert is clamped by means of the resilient force resulting from the displacement of the clamping jaw.

Whether the cutting tool is a holder blade or a rotary slot cutting tool, the displacement of the clamping jaw is obtained by manufacturing the insert pocket so that the distance between the clamping surfaces of the jaws is smaller than the height of the portion of the insert located between the clamping surfaces. Consequently, when an insert is located in the insert pocket, the clamping jaw is held in a displaced position creating an elastic force by means of which the insert is clamped in position.

A well-known problem with cutting tools of the type described above is that the cutting insert is not positively secured in the insert pocket and therefore can become dislodged during cutting operations. For example, this can happen during grooving operations when attempting to withdraw the holder blade from a workpiece. In some cases the cutting insert can be completely pulled out of the holder blade and become embedded in the workpiece. This problem can be especially troubling with rotary slot-cutting tools where the cutting insert can even fly out of the insert pocket under the influence of centrifugal forces, a situation that can be particularly dangerous when operating at high speeds.

SUMMARY OF THE INVENTION

In accordance with the present invention there is provided a cutting insert comprising a cutting portion and a locating portion, the cutting portion comprising a cutting edge formed at the intersection of a rake surface and a relief surface;

an upper surface, a lower surface and a peripheral side surface therebetween, the peripheral side surface comprising:

opposing forward and rear surfaces and opposing side surfaces extending between the forward and rear surfaces; the relief surface being located in the forward surface and the rake surface being located in the upper surface; the locating portion extends downwardly from the cutting portion away from the upper surface; the locating portion comprising opposing forward and rear locating surfaces, the rear locating surface being located in the rear surface and the forward locating surface being located in the lower surface; and a lower locating surface located in the lower surface and opposing the upper surface, and extending between the forward surface and the forward locating surface.

Preferably, in a side view of the cutting insert the cutting portion is wider than locating portion.

Further preferably, the forward and rear locating surfaces converge downwardly.

If desired, the rear surface is concave.

Further if desired, the rear surface is concavely V-shaped.

If desired, the lower locating surface is concave.

Further if desired, the lower locating surface is concavely V-shaped.

Typically, the rake surface is provided with a chip forming groove.

If desired, the cutting insert is provided with side cutting edges formed at the intersection of the side surfaces with the rake surface.

There is also provided in accordance with the present invention a cutting tool comprising an insert holder in which a cutting insert in accordance with the present invention is resiliently retained in an insert pocket.

The insert holder comprises a clamping portion, the clamping portion comprising a clamping jaw resiliently connected to a base jaw and forming a single integral piece therewith, the base jaw has an abutment surface and the clamping jaw has a clamping surface facing opposite a lower portion of the abutment surface, the clamping jaw is further provided with an insert stop surface that is generally transverse to the clamping surface, and the cutting insert is retained in the insert pocket with the abutment surface of the base jaw abutting the rear surface of the cutting insert, the clamping surface of the clamping jaw abutting the forward locating surface of the cutting insert and the insert stop surface of the clamping jaw abutting the lower locating surface of the cutting insert.

If desired, the abutment surface is convex.

Further if desired, the abutment surface is convexly V-shaped.

Generally, the abutment surface is divided by a base recess into an upper abutment surface and lower abutment surface.

If desired, the insert stop surface is convex.

Further if desired, the insert stop surface is convexly V-shaped.

Typically, the base jaw is connected to the clamping jaw via a recess, and a through hole is located rearwardly to the base jaw for receiving a key.

In accordance with one application of the present invention, the cutting tool is a rotary slot cutting tool.

In accordance with another application the cutting tool is a grooving, parting off or turning tool and the insert holder is a holder blade.

BRIEF DESCRIPTION OF THE DRAWINGS

For a better understanding of the present invention and to show how the same may be carried out in practice, reference will now be made to the accompanying drawings, in which.

DETAILED DESCRIPTION OF PREFERRED EMBODIMENTS

Figure 1:
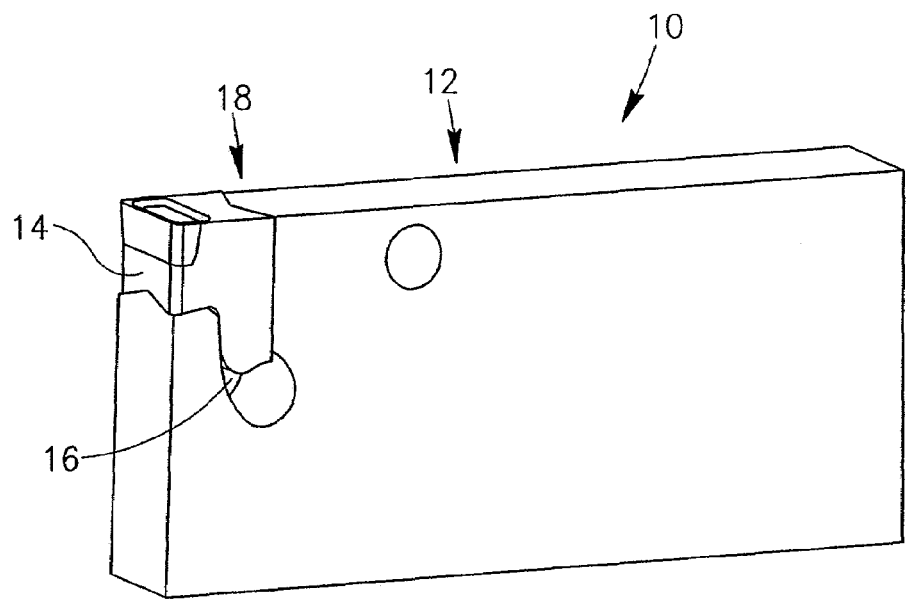
FIG. 1 is a perspective view of a first cutting tool in accordance with the present invention.
Figure 2:
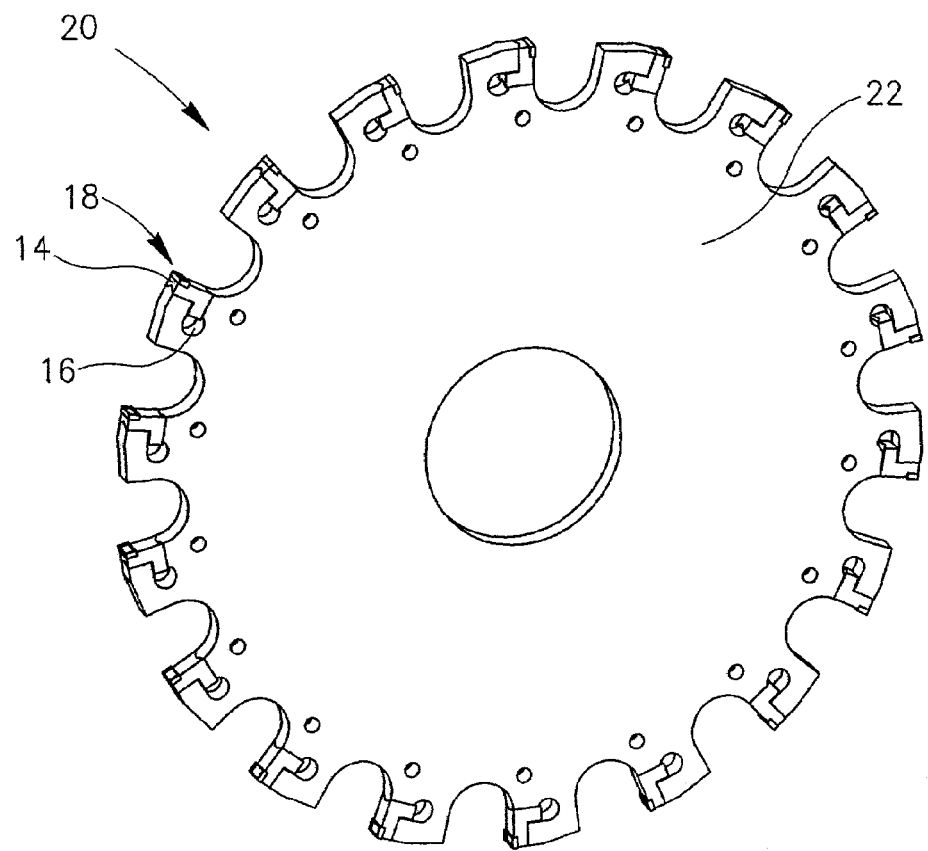
FIG. 2 is a perspective view of a second cutting tool in accordance with the present invention.
Figure 3:
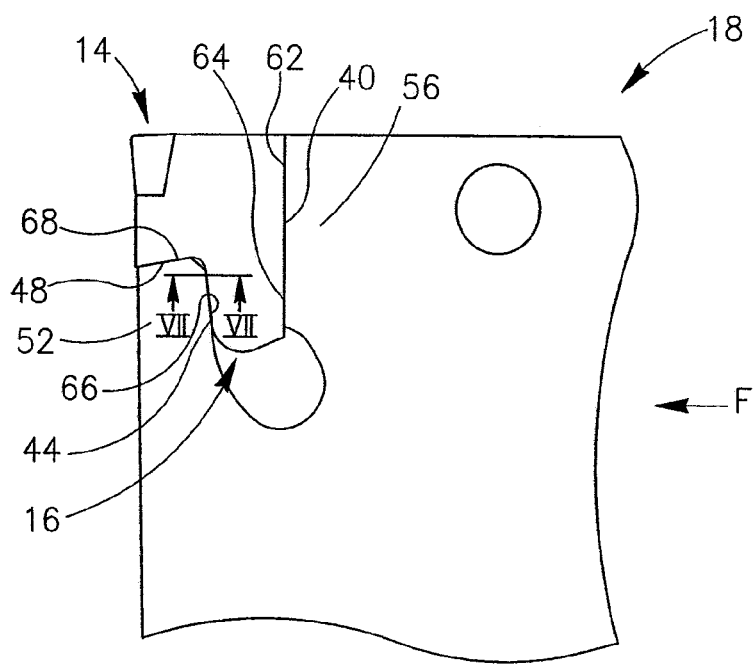
FIG. 3 is a side view of a cutting section of the cutting tools in accordance with the present invention.

Attention is first drawn to FIGS. 1 and 2 showing two cutting tools in accordance with the present invention. FIG. 1 shows a first cutting tool 10 used for metal cutting operations such as grooving and parting off. The first cutting tool 10 comprises an insert holder 12 in the form of a rectangular blade with a cutting insert 14 resiliently retained in an insert pocket 16. The cutting insert 14 is typically manufactured by form-pressing and sintering carbide powders. FIG. 2 shows a second cutting tool 20, used for rotary slot metal cutting operations. The second cutting tool 20 comprises an insert holder 22 in the form of a circular disc with cutting inserts 14 resiliently retained in identical insert pockets 16 arranged around the periphery of the disc. The cutting tools 10, 20 comprise a cutting section 18 which includes the cutting insert 14, the insert pocket 16 and the immediate vicinity of the insert pocket 16. The cutting section 18 is shown in FIG. 3. It should be noted that directional terms appearing throughout the specification and claims, e.g. "forward", "rear", "upper", "lower", etc., are used as terms of convenience to distinguish the location of various surfaces relative to each other. These terms are defined with reference to FIGS. 3, 4 and 5; however, they are used for illustrative purposes only, and are not intended to limit the scope of the appended claims.

Figure 4:
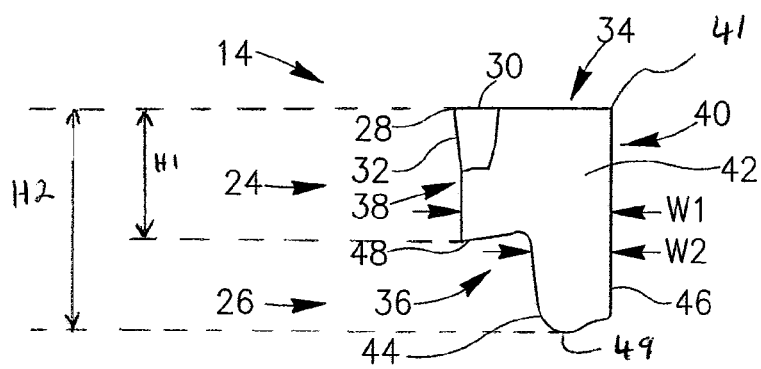
FIG. 4 is a side view of a cutting insert in accordance with the present invention.

Attention is now drawn to FIG. 4. The cutting insert 14 comprises a cutting portion 24 and a locating portion 26. The cutting portion 24 comprises a cutting edge 28 formed at an intersection of a rake surface 30 and a relief surface 32. The cutting insert 14 further comprises an upper surface 34, a lower surface 36 and a peripheral side surface therebetween. The peripheral side surface comprises opposing forward and rear surfaces 38, 40 and opposing side surfaces 42 extending between the forward and rear surfaces 38, 40. The relief surface 32 is located in the forward surface 38 and the rake surface 30 is located in the upper surface 34. A rear edge 41 is formed at a juncture between the upper surface 34 and the rear surface 40, the rear edge 41 and the cutting edge 28 being at the same height in a side view of the cutting insert.

A first distance W1 is defined between the forward surface 38 and the rear surface 40. The locating portion 26 extends downwardly from the cutting portion 24 in a direction away from upper surface 34 and comprises opposing forward and rear locating surfaces 44, 46 that converge downwardly. A second distance W2 is defined between the forward and the rear locating surfaces 44, 46. Although the first distance W1 is not necessarily constant for the whole of the cutting portion 24 and although the second distance W2 decreases downwardly along the length of the locating portion 26, the cutting portion 24 is wider than the locating portion 26 in a side view of the cutting insert 14, as can be seen in the figures, and especially in FIGS. 3 and 4. In other words, the first distance W1 is greater than the second distance W2.

The rear locating surface 46 is located in the rear surface 40 and the forward locating surface 44 is located in the lower surface 36. In addition, a lower locating surface 48 is located in the lower surface 36 opposing the upper surface 34 and extends between the forward surface 38 and the forward locating surface 44. A portion of the lower surface 36 comprises a curved bottom surface 49 which extends rearwardly from the forward locating surface 44 to the rear locating surface 46 of the rear surface 40. In a side view of the cutting insert 14, the rear surface 40, including the rear locating surface 46, is straight. Furthermore, a maximum height H1 between the lowermost portion of the forward surface 38 and the upper surface 34 is smaller than a maximum height H2 between the bottom surface 49 and the upper surface 34.

Figure 5:
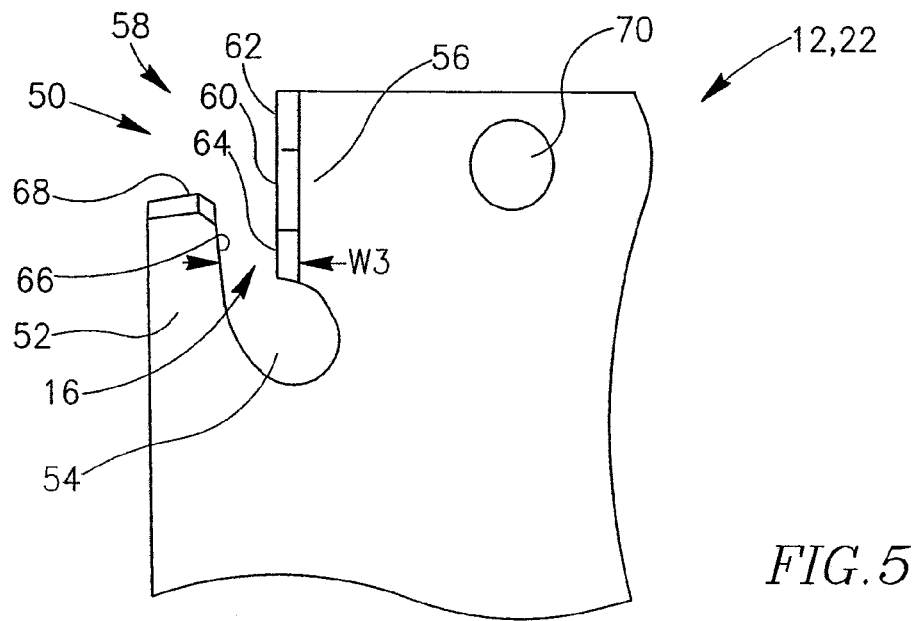
FIG. 5 is a side view of the cutting section of FIG. 3 with the cutting insert removed.

Referring to FIG. 5, a clamping portion 50 of the insert holder 12, 22 comprises a clamping jaw 52 resiliently connected via a recess 54 to a base jaw 56 forming a single integral piece therewith. The base jaw 56 has an abutment surface 58 adjacent the insert pocket 16. The abutment surface 58 is divided by a base recess 60 into an upper abutment surface 62 along an upper portion thereof and a lower abutment surface 64 along a lower portion thereof. The clamping jaw 52 has a clamping surface 66 adjacent the insert pocket 16 and generally facing opposite the lower abutment surface 64 of the base jaw 56. A third distance W3 is defined between the clamping surface 66 and the lower abutment surface 64. The third distance W3 decreases downwardly. The clamping jaw 52 is further provided with an insert stop surface 68 located at an upper end thereof and generally transverse to the clamping surface 66. The upper and lower abutment surfaces 62, 64 of the base jaw 56 and the clamping surface 66 of the clamping jaw 52 converge downwardly. A through hole 70 located rearwardly of the base jaw 56 is provided for receiving a key to aid in the insertion of the cutting insert 14 into the insert pocket 16 and for removal of the cutting insert 14 from of the insert pocket 16, when used in conjunction with the recess 54.

As seen in FIG. 4, in a side view, the lower locating surface 48 slopes downwardly and forwardly, from the forward locating surface 44 towards the lowermost portion of the forward surface 38. Similarly, as seen in FIG. 5, in a side view, an upper portion of the insert stop surface 68 also slopes downwardly and forwardly, from proximate the clamping surface 66 to the front face of the insert holder 12, 22. When the insert 14 is seated in the insert holder 12, 22, in a side view, the downwardly and forwardly directed lower locating surface 48 abuts the downwardly and forwardly directed insert stop surface 68.

Figure 6:
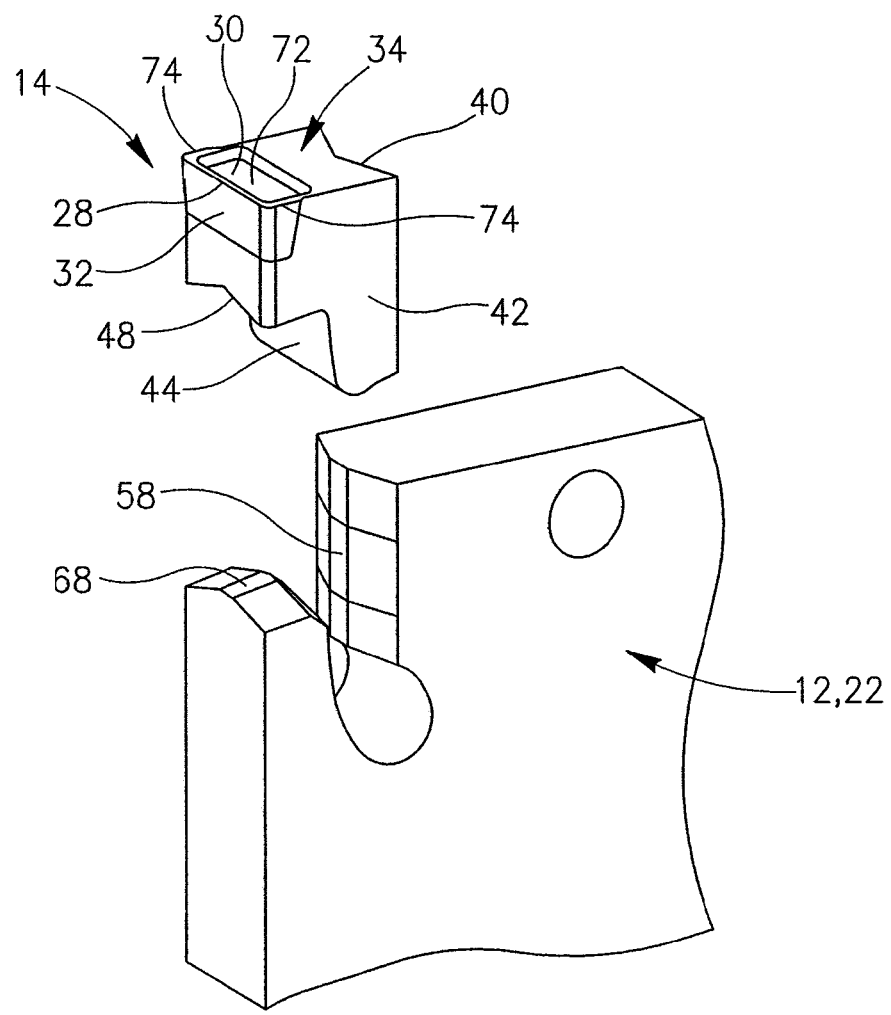
FIG. 6 is an exploded perspective view of the cutting section of FIG. 3.

Attention is now drawn to FIG. 6 in which additional features of the cutting insert 14 and the insert holder 12, 22 are shown. The insert stop surface 68 of the insert holder 12, 22 may be of a convex V-shape, and the lower locating surface 48 of the cutting insert 14 may be of a mating concave V-shape. Similarly, the abutment surface 58 of the insert holder 12, 22 may be of a convex V-shape, and the rear surface 40 of the cutting insert 14 may be of a mating concave V-shape. The mating convex and concave surfaces prevent lateral movement of the cutting insert 14 with respect to the insert holder 12, 22. The rake surface 30 may also be provided with a chip forming groove 72. Moreover, the cutting insert 14 may also be provided with side cutting edges 74, formed at the intersection of the side surfaces 42 with the rake surface 30.

Figure 7:
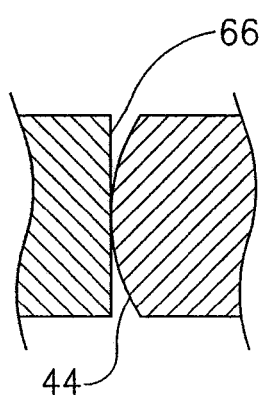
FIG. 7 is a partial cross sectional view taken along the line VII-VII in FIG. 3 passing through the clamping surface of the insert holder and forward locating surface of the cutting insert.

Referring back to FIG. 3, it is seen that with the cutting insert 14 retained in the insert pocket 16, the abutment surfaces 62, 64 of the base jaw 56 abut the rear surface 40 of the cutting insert 14, the clamping surface 66 of the clamping jaw 52 abuts the forward locating surface 44 of the cutting insert 14 and the insert stop surface 68 of the clamping jaw 52 abuts the lower locating surface 48 of the cutting insert 14. Thus, as seen in the assembled tool of FIG. 3, the lower locating surface 48, the forward locating surface 44 and the rear surface 40, but neither the upper surface 34 nor the bottom surface 49, form the abutment surfaces of the cutting insert 14. In the assembled tool, the upper surface 34 and the bottom surface 49 remain unabutted by the insert holder, with the bottom surface 49 being exposed to the recess 54. To avoid the arrangement, of the two sets of convex-concave mating surfaces, from being over constrained, the clamping surface 66 is chosen to be flat and the forward locating surface 44 is chosen to be convex (as shown in FIG. 7). The width dimension W2 is generally greater than the width dimension W3, so that when the locating portion 26 is located in the insert pocket 16, the clamping jaw 52 is forced away from the base jaw 56 giving rise to a resilient force which clamps the locating portion 26 in the insert pocket 16.

During a rotary slot cutting operation a centrifugal force F operates on the cutting insert 14. It is clear from FIG. 3 that the clamping surface 66 of the clamping jaw 52 opposes the force F thus preventing the cutting insert 14 from flying out of the insert pocket 16. On completion of a grooving operation, during withdrawal of the cutting tool 10 from a workpiece, the cutting insert 14 can come into contact with the groove walls giving rise to frictional forces F which operate to extract the cutting insert 14 from the insert pocket 16. However, the presence of the clamping surface 66 of the clamping jaw 52 prevents extraction of the cutting insert 14.

Although the present invention has been described to a certain degree of particularity, it should be understood that various alterations and modifications could be made without departing from the scope of the invention as hereinafter claimed.

What is claimed is:

1. A cutting insert comprising:
    an upper surface, a lower surface, and a peripheral side surface therebetween, the peripheral side surface comprising opposing forward and rear surfaces, and opposing side surfaces extending between the forward and rear surfaces, a rear locating surface being formed in the rear surface;
    a cutting edge formed at the intersection of a rake surface and a relief surface, with the relief surface being located in the forward surface and the rake surface being located in the upper surface;
    wherein in a side view of the cutting insert:
        the rear surface, including the rear locating surface, is straight; and
    the lower surface comprises:
        a lower locating surface extending rearwardly from the forward surface;
        a forward locating surface extending downwardly from the lower locating surface; and
        a bottom surface extending rearwardly from the forward locating surface to the rear surface, the entire bottom surface being lower than both the front surface and the lower locating surface;
    and wherein the lower locating surface, the forward locating surface, and the rear locating surface, but neither the upper surface nor the bottom surface, form abutment surfaces on the cutting insert.

2. The cutting insert according to claim 1, wherein:
    a maximum height H1 between a lowermost portion of the forward locating surface and the upper surface is smaller than a maximum height H2 between the bottom surface and the upper surface, and a first distance W1 between the forward surface and the rear surface is greater than a second distance W2 between the forward locating surface and the rear locating surface.

3. The cutting insert according to claim 1, wherein the lower locating surface slopes downwardly and forwardly, from the forward locating surface towards a lowermost portion of the forward surface.

4. The cutting insert according to claim 1, wherein the forward locating surface and the rear locating surface converge in a downward direction.

5. The cutting insert according to claim 1, wherein:
    the bottom surface is curved.

6. The cutting insert according to claim 1, further comprising a rear edge formed at a juncture between the upper surface and the rear surface, wherein:
    in a side view of the cutting insert, the rear edge and the cutting edge are at the same height.

7. The cutting insert according to claim 1, wherein the rear surface is concave.

8. The cutting insert according to claim 7, wherein the rear surface is concavely V-shaped.

9. The cutting insert according to claim 1, wherein the lower locating surface is concave.

10. The cutting insert according to claim 9, wherein the lower locating surface is concavely V-shaped.

11. A cutting tool comprising:
    an insert holder comprising an insert pocket and a clamping portion, the clamping portion comprising a clamping jaw resiliently connected to a base jaw and forming a single integral piece therewith, the base jaw having an abutment surface and the clamping jaw having a clamping surface facing opposite a lower portion of the abutment surface, the clamping jaw being further provided with an insert stop surface that is generally transverse to the clamping surface; and
    and said insert resiliently retained in the insert pocket, wherein:
    the abutment surface of the base jaw abuts the rear surface of the cutting insert;
    the clamping surface of the clamping jaw abuts the forward locating surface of the cutting insert;
    the insert stop surface of the clamping jaw abuts the lower locating surface of the cutting insert.

12. The cutting tool according to claim 11, wherein:
    the cutting insert is resiliently retained in the insert pocket with the top surface remaining unabutted by the insert holder.

13. The cutting tool according to claim 11, wherein:
the base jaw is connected to the clamping jaw via a recess; and
the bottom surface of the cutting insert is exposed to the recess and remains unabutted by the insert holder.

14. The cutting tool according to claim 11, wherein, in a side view:
the lower locating surface slopes downwardly and forwardly, from the forward locating surface towards a lowermost portion of the forward surface;
an upper portion of the insert stop surface slopes downwardly and forwardly, from proximate the clamping surface to a front face of the insert holder; and
the downwardly and forwardly sloping lower locating surface abuts the downwardly and forwardly sloping insert stop surface.

15. The cutting tool according to claim 11, wherein:
the abutment surface is convex; and
the abutment surface is divided by a base recess into an upper abutment surface and a lower abutment surface.

16. The cutting tool according to claim 15, wherein:
the clamping surface is convex.

17. A cutting insert comprising:
an upper surface, a lower surface, and a peripheral side surface therebetween, the peripheral side surface comprising a forward surface, a rear surface, and opposing side surfaces extending between the forward surface and the rear surface;
a cutting edge formed at the intersection of a rake surface and a relief surface, with the relief surface being located in the forward surface and the rake surface being located in the upper surface;
wherein:
in a side view of the cutting insert, at least a portion of the lower surface is curved;
in a side view of the cutting insert, the lower surface comprises:
a lower locating surface extending rearwardly from the forward surface;
a forward locating surface extending downwardly from the lower locating surface; and
a bottom surface extending rearwardly from the forward locating surface to the rear surface, the entire bottom surface being lower than both the front surface and the lower locating surface; and
the lower locating surface, the forward locating surface, and the rear surface, but neither the upper surface nor the bottom surface, form abutment surfaces on the cutting insert.

18. The cutting insert according to claim 17, further comprising a rear edge formed at a juncture between the upper surface and the rear surface, wherein:
in a side view of the cutting insert, the rear edge and the cutting edge are at the same height.

19. The cutting insert according to claim 17, wherein:
a maximum height H1 between a lowermost portion of the forward locating surface and the upper surface is smaller than a maximum height H2 between the bottom surface and the upper surface, and a first distance W1 between the forward surface and the rear surface is greater than a second distance W2 between the forward locating surface and a rear locating surface formed in the rear surface.

20. The cutting insert according to claim 19, wherein the forward locating surface and the rear locating surface converge in a downward direction.

21. The cutting insert according to claim 17, wherein the lower locating surface slopes downwardly and forwardly, from the forward locating surface towards a lowermost portion of the forward surface.

22. The cutting insert according to claim 17, wherein the rear surface is concave.

23. The cutting insert according to claim 22, wherein the lower locating surface is concave.

24. A cutting tool comprising:
an insert holder comprising an insert pocket and a clamping portion, the clamping portion comprising a clamping jaw resiliently connected to a base jaw and forming a single integral piece therewith, the base jaw having an abutment surface and the clamping jaw having a clamping surface facing opposite a lower portion of the abutment surface, the clamping jaw being further provided with an insert stop surface that is generally transverse to the clamping surface; and
and said insert resiliently retained in the insert pocket, wherein:
the abutment surface of the base jaw abuts the rear surface of the cutting insert;
the clamping surface of the clamping jaw abuts the forward locating surface of the cutting insert;
the insert stop surface of the clamping jaw abuts the lower locating surface of the cutting insert, and prevents further insertion of the cutting insert into the insert pocket.

25. The cutting tool according to claim 24, wherein:
the cutting insert is resiliently retained in the insert pocket with the top surface remaining unabutted by the insert holder.

26. The cutting tool according to claim 25, wherein:
the base jaw is connected to the clamping jaw via a recess; and
the bottom surface of the cutting insert is exposed to the recess and remains unabutted by the insert holder.

27. The cutting tool according to claim 24, wherein:
the base jaw is connected to the clamping jaw via a recess; and
the bottom surface of the cutting insert is exposed to the recess and remains unabutted by the insert holder.

28. The cutting tool according to claim 24, wherein, in a side view:
the lower locating surface slopes downwardly and forwardly, from the forward locating surface towards a lowermost portion of the forward surface;
an upper portion of the insert stop surface slopes downwardly and forwardly, from proximate the clamping surface to a front face of the insert holder; and
the downwardly and forwardly sloping lower locating surface abuts the downwardly and forwardly sloping insert stop surface.

29. The cutting tool according to claim 24, wherein:
the abutment surface is convex; and
the abutment surface is divided by a base recess into an upper abutment surface and a lower abutment surface.

30. The cutting tool according to claim 29, wherein the clamping surface is convex.

* * * * *